United States Patent
Choi et al.

(10) Patent No.: US 9,276,434 B2
(45) Date of Patent: Mar. 1, 2016

(54) WIRELESS POWER SUPPLY APPARATUS, WIRELESS CHARGING APPARATUS, AND WIRELESS CHARGING SYSTEM USING THE SAME

(75) Inventors: Sung-jin Choi, Gunpo-si (KR);
Kang-hyun Yi, Yesan-gun (KR);
Joon-hyun Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1203 days.

(21) Appl. No.: 13/184,769

(22) Filed: Jul. 18, 2011

(65) Prior Publication Data

US 2012/0062173 A1 Mar. 15, 2012

(30) Foreign Application Priority Data

Sep. 10, 2010 (KR) .................. 10-2010-0088909

(51) Int. Cl.
*H02J 7/00* (2006.01)
*H02J 7/02* (2006.01)
*H02J 5/00* (2006.01)

(52) U.S. Cl.
CPC ........ *H02J 7/025* (2013.01); *H02J 5/005* (2013.01)

(58) Field of Classification Search
CPC ........................................ H02J 7/025
USPC ................................. 320/108; 307/104
See application file for complete search history.

(56) References Cited

U.S. PATENT DOCUMENTS

| | | | | |
|---|---|---|---|---|
| 5,723,969 | A * | 3/1998 | Archer et al. | 607/5 |
| 7,956,495 | B2 * | 6/2011 | Jin | 307/104 |
| 2004/0145342 | A1 * | 7/2004 | Lyon | 320/108 |
| 2009/0079387 | A1 * | 3/2009 | Jin et al. | 320/108 |
| 2009/0289595 | A1 * | 11/2009 | Chen et al. | 320/108 |
| 2010/0066304 | A1 * | 3/2010 | Oshimi | 320/108 |
| 2010/0109443 | A1 * | 5/2010 | Cook et al. | 307/104 |
| 2010/0127660 | A1 * | 5/2010 | Cook et al. | 320/108 |
| 2010/0171367 | A1 * | 7/2010 | Kitamura et al. | 307/104 |
| 2011/0133569 | A1 * | 6/2011 | Cheon et al. | 307/104 |

FOREIGN PATENT DOCUMENTS

JP    2000-134830 A    5/2000

OTHER PUBLICATIONS

Communication dated Apr. 14, 2015 issued by the Japanese Patent Office in counterpart Japanese Patent Application No. 2011-189213.

* cited by examiner

*Primary Examiner* — Drew A Dunn
*Assistant Examiner* — Zixuan Zhou
(74) *Attorney, Agent, or Firm* — Sughrue Mion, PLLC (57) ABSTRACT

A wireless charging apparatus and a wireless charging system using the same are provided. The wireless charging apparatus includes a sensing resonator that senses for an external device; a transmission resonator that transmits energy to the external device by magnetic resonance; and a transmission circuit that controls the transmission resonator in accordance with an output of the sensing resonator.

26 Claims, 9 Drawing Sheets

WIRELESS POWER SUPPLY APPARATUS, WIRELESS CHARGING APPARATUS, AND WIRELESS CHARGING SYSTEM USING THE SAME

CROSS-REFERENCE TO RELATED APPLICATION

This application claims priority under 35 U.S.C. §119(a) to Korean Patent Application No. 10-2010-0088909, filed on Sep. 10, 2010, in the Korean Intellectual Property Office, the disclosure of which is incorporated by reference herein in its entirety.

BACKGROUND

1. Field

Apparatuses and systems consistent with the disclosure relate to a wireless power supply apparatus, a wireless charging apparatus, and a wireless charging system using the same, which can recognize the existence of a subject of charging.

2. Description of the Related Art

Recently, the development of wireless power transfer technology has been accelerated. At present, a general technology of implementing wireless power transfer may be classified into an induction type and a resonance type. The induction type wireless power transfer has been commercialized to produce corresponding products, but the resonance type wireless power transfer has not been greatly commercialized.

Although the resonance type wireless power transfer has a wide application range in degree of freedom of position and distance, it has several disadvantages. Particularly, currently, using the resonance type wireless power transfer, it is unable to recognize whether a receiving device that can wirelessly receive power exists.

Figure 1:
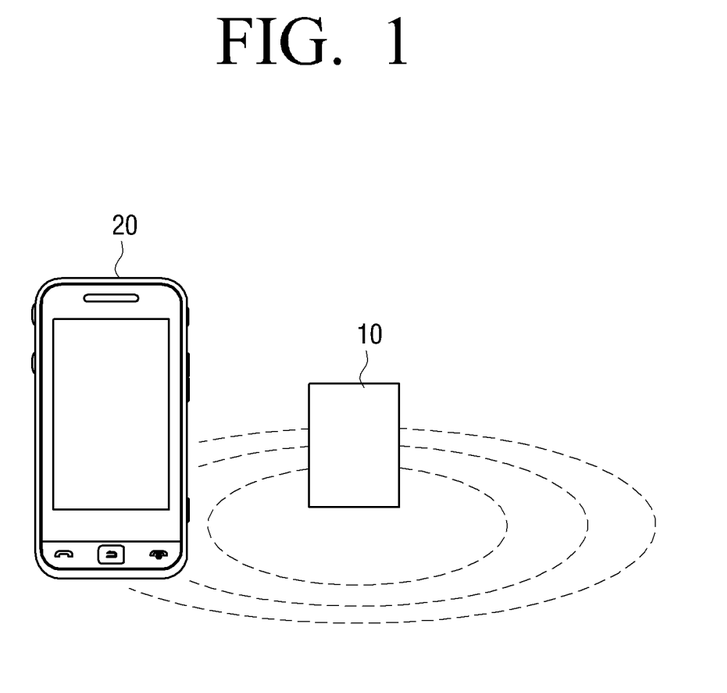
FIG. 1 is a view illustrating a wireless charging system in the related art.

Referring to FIG. 1, if a receiver 20 that can wirelessly receive power comes into the neighborhood of a transmitter 10, the transmitter 10 that can wirelessly transfer power transfers power using a general principle of wireless power transfer. However, in the case in which the receiver 20 moves out of the neighborhood of the transmitter 10, the transmitter 10 cannot recognize this, and continuously maintain its maximum power. This may cause unnecessary power consumption.

In order to prevent such unnecessary power consumption, it is required to turn off the power of the transmitter 10 in the case in which the receiver 20 goes away from the transmitter 10 or in the case in which the power charging to the receiver 20 is completed, and this causes inconvenience.

SUMMARY

Exemplary embodiments address the disadvantages described above. Accordingly, an aspect of one or more exemplary embodiments provides a wireless power supply apparatus, a wireless charging apparatus, and a wireless charging system using the same, which can recognize the existence or nonexistence of a load device and turn off the operation of a power transmitter.

According to one aspect of one or more exemplary embodiments, a wireless power supply apparatus that wirelessly supplies power to an external device in a resonant method includes a sensing resonator that senses for the external device; a transmission resonator that transmits energy to the external device by magnetic resonance; and a transmission circuit that controls the transmission resonator in accordance with an output of the sensing resonator.

The transmission circuit may determine whether to operate the transmission resonator by comparing the output of the sensing resonator with a threshold level.

The sensing resonator may wirelessly receive the energy by the magnetic resonance from the transmission resonator, and determine whether the external device is approaching based on the received energy.

The sensing resonator may determine that the external device is approaching and outputs a first level if a voltage or current that is measured by the sensing resonator is lower than a reference value.

The sensing resonator may determine that the external device is not approaching and outputs a second level if a voltage or current that is measured by the sensing resonator is higher than a reference value.

The sensing resonator may have a Q (quality factor) value that is smaller than a Q value of the transmission resonator.

The transmission circuit may control the sensing of the sensing resonator by turning on the transmission resonator for a predetermined time in a predetermined period.

According to another aspect of one or more exemplary embodiments, a wireless charging apparatus included in a wireless charging system includes a transmission resonator; a transmission circuit that resonates the transmission resonator by generating a magnetic field; and a sensing resonator that controls whether to resonate the transmission resonator based on a distance between an external device to be charged and the wireless charging apparatus.

The sensing resonator may determine whether the external device to be charged is positioned within a distance from the wireless charging apparatus, and control whether to resonate the transmission resonator according to a result of determination.

The sensing resonator may resonate the transmission resonator if it is determined that the external device to be charged is within the distance.

The wireless charging apparatus may further include a level detector that detects a signal level of the sensing resonator; wherein the level detector controls an on/off operation of the transmission circuit according to the detected signal level.

The level detector may prevent the transmission resonator from resonating by turning off the transmission circuit if the level of the signal received from the sensing resonator is equal to or greater than a threshold level, and guide the resonating of the transmission resonator by turning on the transmission circuit if the level of the received signal is lower than the threshold level.

The signal level may be a voltage level or a current level that is detected by the sensing resonator.

The transmission circuit may further include a transmission feeder; wherein the transmission feeder forms a magnetic field that is concentrated on a frequency by exciting the transmission resonator.

The external device to be charged may include a reception resonator; wherein a resonance frequency of the transmission resonator is equal to a resonance frequency of the reception resonator.

The transmission resonator and the reception resonator may have a high Q (quality factor) value and the sensing resonator may have a low Q (quality factor) value.

The external device to be charged may change the Q value of the reception resonator and the transmission circuit may stop the transfer of energy to the external device to be charged.

According to still another aspect of one or more exemplary embodiments, a wireless charging system includes a transmitter including a transmission resonator; a transmission circuit that resonates the transmission resonator by generating a magnetic field; and a sensing resonator that controls whether to resonate the transmission resonator based on a distance between an external device to be charged and the transmitter of the wireless charging system; and a receiver including a reception resonator that receives energy from the transmission resonator; and a reception circuit that converts the energy received by the reception resonator into electric energy.

The receiver may further include a charging unit that charges using the electric energy converted by the reception circuit.

The sensing resonator may determine whether the receiver is positioned within a distance from the transmitter, and control whether to resonate the transmission resonator according to a result of determination.

The sensing resonator may resonate the transmission resonator if it is determined that the receiver is within the distance from the transmitter.

The transmitter may further include a level detector that detects a signal level of the sensing resonator; wherein the level detector controls an on/off operation of the transmission circuit according to the detected signal level.

The level detector may prevent the transmission resonator from resonating by turning off the transmission circuit if the level of the signal received from the sensing resonator is equal to or greater than a threshold level, and the level detector may control the resonating of the transmission resonator by turning on the transmission circuit if the level of the received signal is lower than the threshold level.

The signal level may be a voltage level or a current level that is detected by the sensing resonator.

The transmitter may further include a transmission feeder; wherein the transmission feeder forms a magnetic field that is concentrated on a frequency by exciting the transmission resonator.

A resonance frequency of the transmission resonator may be equal to a resonance frequency of the reception resonator.

The reception circuit may control the reception resonator not to receive energy from the transmission resonator in the case in which charging of the charging unit is completed.

The reception circuit may control the reception resonator not to receive energy from the transmission resonator by changing a Q (quality factor) value of the transmission resonator in the case in which charging of the charging unit is completed.

The transmission resonator and the reception resonator may have a high Q (quality factor) value and the sensing resonator may have a low Q (quality factor) value.

BRIEF DESCRIPTION OF THE DRAWINGS

The above and other aspects will be more apparent from the following detailed description when taken in conjunction with the accompanying drawings, in which.

DETAILED DESCRIPTION

Exemplary embodiments are described in detail with reference to the accompanying drawings.

Figure 2:
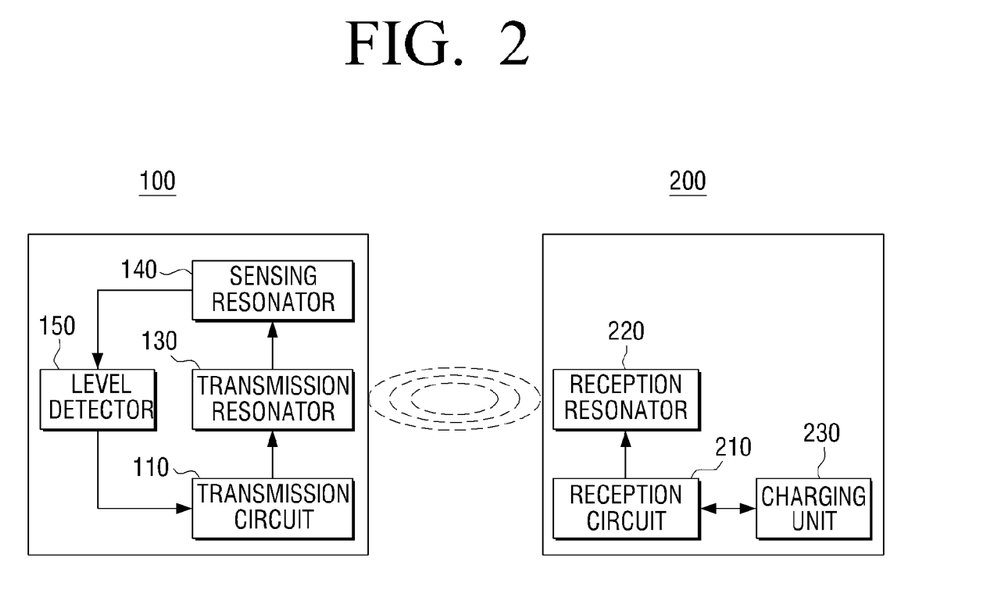
FIG. 2 is a block diagram illustrating the configuration of a wireless charging system according to an exemplary embodiment.

FIG. 2 is a block diagram illustrating the configuration of a wireless charging system according to an exemplary embodiment. As illustrated in FIG. 2, a wireless charging system according to an exemplary embodiment includes a transmitter 100 and a receiver 200.

The transmitter 100 includes a transmission circuit 110, a transmission resonator 130, a sensing resonator 140, and a level detector 150. The receiver 200 includes a reception circuit 210, a reception resonator 220, and a charging unit 230.

The wireless charging system according to an exemplary embodiment may be a resonance type wireless charging system. For purposes of this disclosure, the receiver 100 denotes the subject that supplies the power, and the transmitter 200 denotes the subject that receives the power.

The transmission circuit 110 forms a magnetic field by generating a high-frequency AC waveform, and forms the magnetic field that is concentrated on a resonance frequency. The transmission circuit 110 may be configured to include a transmission feeder (not illustrated). The transmission feeder may be configured separately and spaced apart from the transmission circuit. From the viewpoint of the function of the transmission circuit 110, the transmission circuit 110 excites the transmission feeder by generating a high-frequency AC waveform. Then, the transmission feeder guides the generation of the magnetic field that is concentrated on a specified frequency by exciting the transmission resonator connected thereto in an inductive coupling form.

The transmission resonator 130 generates a magnetic field that is concentrated on a specified frequency. The transmission resonator 130 is designed to have a high Q (quality factor) value. The Q value can be changed by modifying the property of a capacitor, an inductor, or a resistor.

The sensing resonator 140 has a low Q (quality factor) and determines whether the receiver 200 is in the neighborhood of the transmitter 100. Since the sensing resonator 140, unlike a general reception resonator, has a low Q (quality factor) value, the transmission resonator 130 transmits the power only to a reception resonator 220 of the receiver 200 in the case where the reception resonator 220 of the receiver 200 which has a high Q value is within a certain distance from the transmission resonator 130. However, in the case in which the reception resonator 220 of the receiver 200 does not exist within the certain distance, the transmission resonator 130 transmits the power to the sensing resonator 140 which has the low Q value.

In other words, the sensing resonator 140 has a sensing function that can determine whether the receiver 200 exists within the certain distance from the transmitter 100.

The level detector 150 detects the level change of the sensing resonator 140. Here, the term "level change" denotes a change of a voltage or current of the sensing resonator 140. That is, the level detector 150 is physically coupled to the sensing resonator 140 in order to sense the change of voltage of the sensing resonator 140 or the change of current flowing through the sensing resonator according to the energy flowing into the sensing resonator 140. In this case, if the level of the voltage or current detected by the sensing resonator 140 is higher than a threshold voltage or current, the level detector 150 determines that the energy has flowed from the transmission resonator 130 to the sensing resonator 140. As described above, this state means that the receiver 200 is far apart from the transmitter 100. If the level detector 150 determines that the energy has flowed from the transmission resonator 130 to the sensing resonator 140, it turns off the transmission circuit 110. Accordingly, the transmission circuit 110 does not resonate the transmission resonator 130 any further. The threshold voltage or current may be a predetermined level.

On the other hand, if the level of the voltage or current detected by the sensing resonator 140 is lower than the threshold voltage or current level, the level detector 150 determines that the energy has not flowed from the transmission resonator 130 to the sensing resonator 140. This state means that the receiver 200 exists within the certain distance from the transmitter 100. If the level detector determines that the energy has not flowed from the transmission resonator 130 to the sensing resonator 140, it turns on the transmission circuit 110. Accordingly, as described above, the transmission circuit 110 excites the transmission feeder, and transmits again the energy to the reception resonator 220 though the transmission resonator 100.

The receiver 200 receives the energy from the transmitter 100. The reception resonator 220 of the receiver 200 will be first described. As is the case with the transmission resonator 130, the reception resonator 220 also has a high Q value, and in the case where the reception resonator 220 is located within the certain distance from the transmitter 100, it receives the energy from the transmission resonator 130.

The reception circuit 210 converts the energy input from the reception resonator 220 into electric energy, and transfers this electric energy to the charging unit 230. Also, if it is determined that that the charging is completed, the reception circuit 210 intercepts the energy transmission from the transmitter 100 by changing the Q value of the reception resonator 220.

The charging unit 230 receives and stores the electric energy from the reception circuit 210.

In relation to the description with reference to FIG. 2, although it is exemplified that the level detector 150 turns on/off the transmission circuit 110 by detecting the signal level of the sensing resonator 140, the detection is not necessarily limited to the turn-on/off of the transmission circuit 110. It may be also possible to control the transmission circuit 110 by increasing or decreasing the output of the transmission circuit 110.

Also, in addition to the configuration included in the wireless charging system according to an exemplary embodiment, another configuration may be added thereto, or the existing configuration may be replaced by another configuration having the same function. In the following description, well-known element structures and technologies are not described in detail since they would obscure the invention in unnecessary detail. The technical features could be understood by those of ordinary skill in the art from the foregoing explanation.

Figure 3:
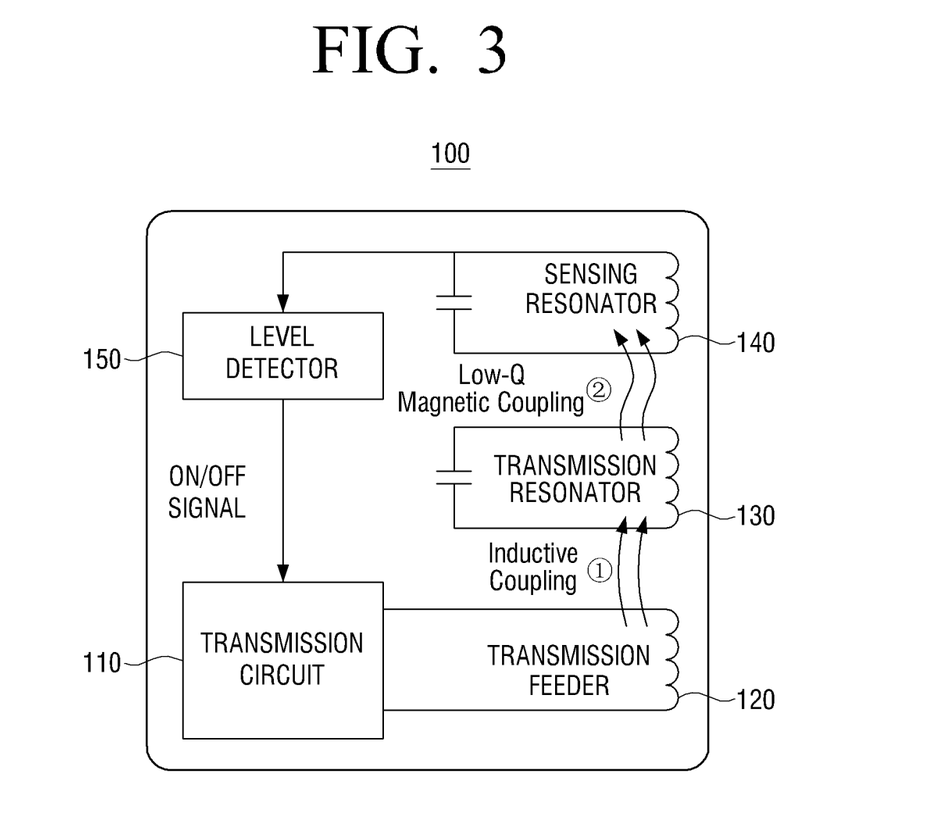
FIG. 3 is a diagram illustrating an operation of a wireless charging apparatus according to an exemplary embodiment.
Figure 4:
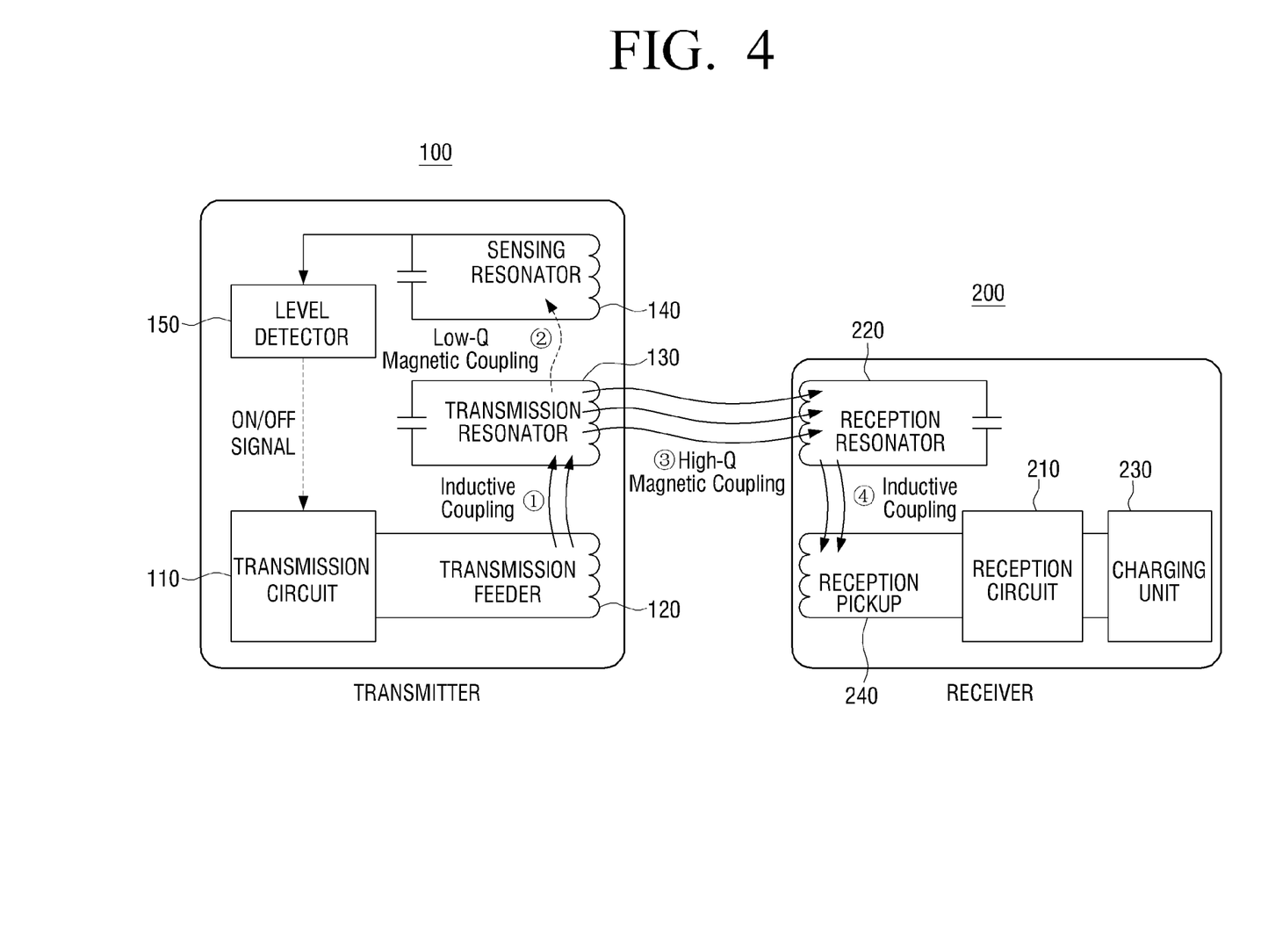
FIG. 4 is a diagram illustrating an operation of a wireless charging apparatus according to an exemplary embodiment.

FIGS. 3 and 4 are diagrams illustrating the wireless charging apparatus according to an exemplary embodiment. The wireless charging apparatus as illustrated in FIGS. 3 and 4 may correspond to the transmitter 100 illustrated in FIG. 2, and thus the explanation thereof will be made using the same reference numerals. More specifically, FIGS. 3 and 4 show the operation that is related to the determination whether the receiver 200 exists within the certain distance. FIG. 3 shows a case where the receiver 200 does not exist within the certain distance, and FIG. 4 shows a case where the receiver 200 exists within the certain distance.

In the same manner as in FIG. 2, the wireless charging apparatus of FIG. 3 includes a transmission circuit 110, a transmission resonator 130, a sensing resonator 140, and a level detector 150. In FIG. 3, a transmission feeder 120 is illustrated as a separate configuration. However, the transmission feeder may be included in the transmission circuit 110 as described above.

The sensing resonator 140 has a low Q value unlike a general reception resonator in a resonance type wireless power transfer method. The Q value may be diversely designed by combination of a capacitor, an inductor, and a resistor. By contrast, the transmission resonator 130 is designed to have a high Q value. As illustrated in FIG. 3, the transmission circuit 110 excites the transmission feeder 120. The transmission feeder 120 is inductively coupled to the transmission resonator 130 to excite the transmission resonator 130. In this case, a magnetic field that is concentrated on the resonance frequency is formed. If a resonator having the same resonance frequency exists outside the transmitter 100, an environment in which the power can be transmitted is provided.

However, as illustrated in FIG. 3, in the same manner as the transmission resonator 130, the reception resonator having the high Q value does not exist in the neighborhood of the transmitter 100, and thus most energy output from the transmission resonator 130 is absorbed by the sensing resonator 140.

The sensing resonator 140 generates the change of current or voltage as it absorbs the energy, and the level detector 150, which is physically connected to the sensing resonator 140 detects the change of the signal level, that is, the change of the current or voltage level. That is, as illustrated in FIG. 3, the level detector is connected to one end or both ends of the sensing resonator circuit, and detects the signal level of the sensing resonator 140.

In the case illustrated in FIG. 3, the sensing resonator 140 absorbs the energy from the transmission resonator 130, and thus the level detector 150 determines that the signal level detected from the sensing resonator 140 exceeds the threshold to trigger turning off the transmission circuit 110. Thus, the level detect 150 outputs an on/off signal to turn off the transmission circuit 110. However, alternatively, the level detector 150 may control the transmission circuit 110 to decrease the output of the transmission circuit 110.

Accordingly, the transmission circuit 110 excites the transmission feeder 120 so that it does not output the maximum power to make the transmission resonator 130 form a magnetic field. That is, it reduces unnecessary power consumption.

The operation in the case where the receiver 200 exists within the certain distance of the wireless charging apparatus 100 will be described with reference to FIG. 4.

As described above, in the same manner as the transmission resonator 130, the reception resonator 220 has a high Q value. Also, in the same manner as in FIG. 2, the receiver 200 includes a reception resonator 220, a reception circuit 210, and a charging unit 230. The explanation will be made on the assumption that the receiver 200 in FIG. 4 further includes a reception pickup 240.

In the case where the receiver 200 is positioned within the certain distance from the wireless charging apparatus 100, the transmission resonator 130 transmits energy to the reception resonator 220 that is connected thereto through Q magnetic coupling. In this case, since the sensing resonator 140 has a low Q value as described above, almost no energy inflow occurs. The reception resonator 220 receives the energy through the electromagnetic field formed by the transmission resonator 130, and then transfers the energy to the reception pickup 240 that is inductively coupled thereto. Since the reception pickup 240 is inductively coupled to the reception resonator 220, it can receive the energy. The reception circuit 210 is physically connected to the reception pickup 240, and converts the received energy into electric energy. The electric energy converted by the reception circuit 210 is stored in charging unit 230.

The reception pickup 240 may be a portion of the reception circuit 210 and may be omitted as a separate element. Also, the charging unit 230 may be omitted, and the reception circuit 210 may supply the electric energy to another device connected to the reception circuit 210.

Also, in explaining an exemplary embodiment with reference to FIGS. 3 and 4, the term "certain distance" denotes a distance enough to realize the energy transfer between the transmission resonator 130 and the reception resonator 220 which are connected together through the high Q magnetic coupling. The certain distance may be changed through the change of the Q value, and thus may be diversely changed by the circuit design. Accordingly, the certain distance is not limited to any specified distance.

Figure 5A:
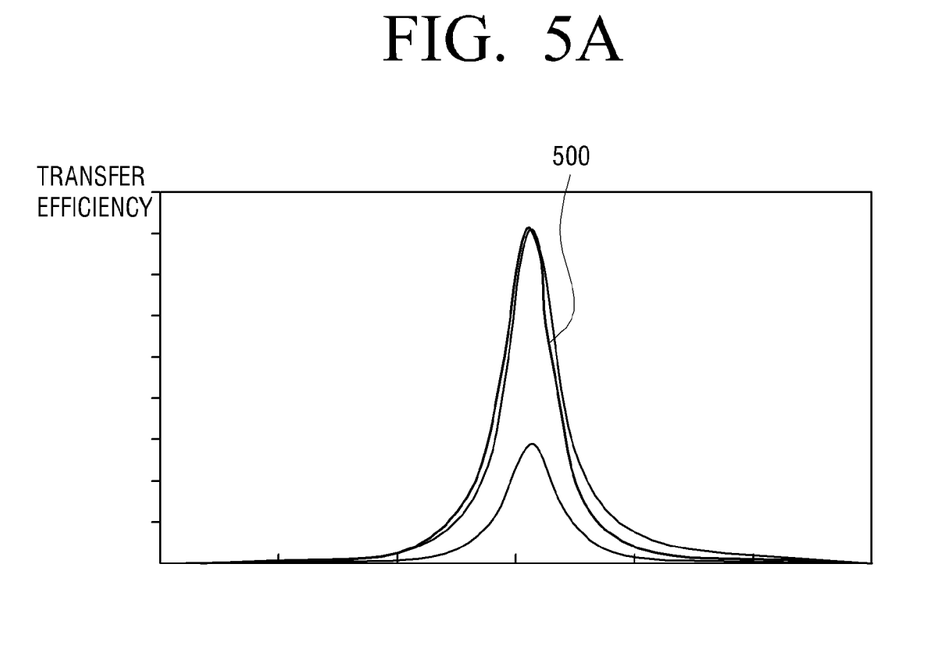
FIG. 5A is a graph illustrating a transfer efficiency of a sensing resonator of a wireless charging apparatus according to an exemplary embodiment.
Figure 5B:
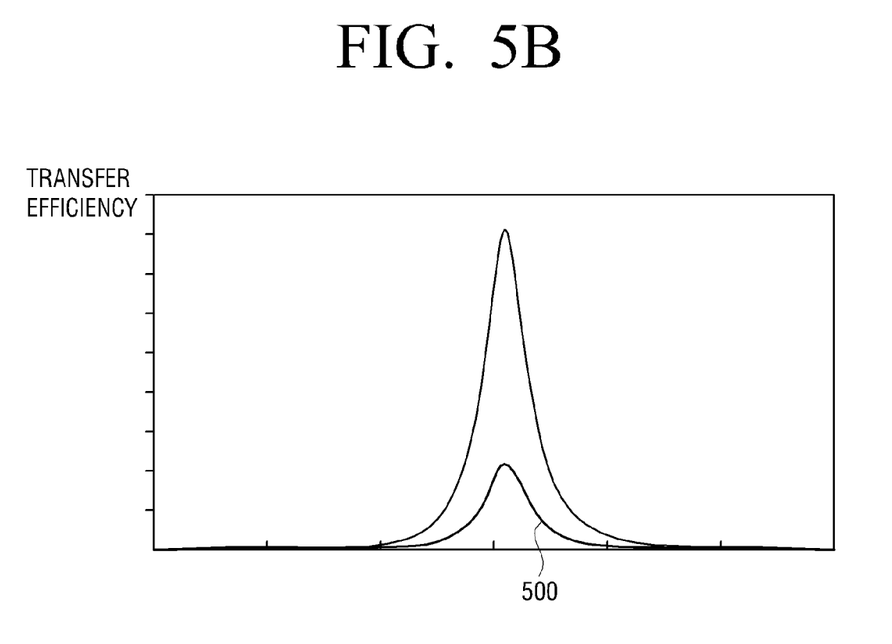
FIG. 5B is a graph illustrating a transfer efficiency of a sensing resonator of a wireless charging apparatus according to an exemplary embodiment.

FIGS. 5A and 5B are graphs illustrating the transfer efficiencies in the case where the existence of the receiver 200 is not recognized and in the case where the existence of the receiver 200 is recognized. More specifically, the transfer efficiencies of energy that flows from the transmission resonator 130 to the sensing resonator 140 in accordance with the existence and nonexistence of the receiver 200 are shown in FIGS. 5A and 5B, respectively.

FIG. 5A shows a case where the existence of the receiver 200 is not recognized. It can be seen from FIG. 5A that the energy transfer efficiency 500 to the sensing resonator 140 is very high. That is, if the existence of the receiver 200 is not recognized, the transfer efficiency of energy that flows from the transmission resonator 130 to the sensing resonator 140 is very high, and thus most energy output from the transmission resonator 130 flows into the sensing resonator 140. In the same manner as described above, the transmission circuit 110 is controlled by the level detector 150 that detects the signal level of the sensing resonator 140.

FIG. 5B shows a case where the existence of the receiver 200 is recognized. It can be seen from FIG. 5B that the energy transfer efficiency 500 to the sensing resonator 140 is very low. That is, if the existence of the receiver 200 is recognized, the transfer efficiency of energy that flows from the transmission resonator 130 to the sensing resonator 140 is very low, and thus almost no energy, which is output from the transmission resonator 130, flows into the sensing resonator 140. As described above, the energy output from the transmission resonator 130 will flow into the reception resonator 230 of the receiver 200.

Figure 6A:
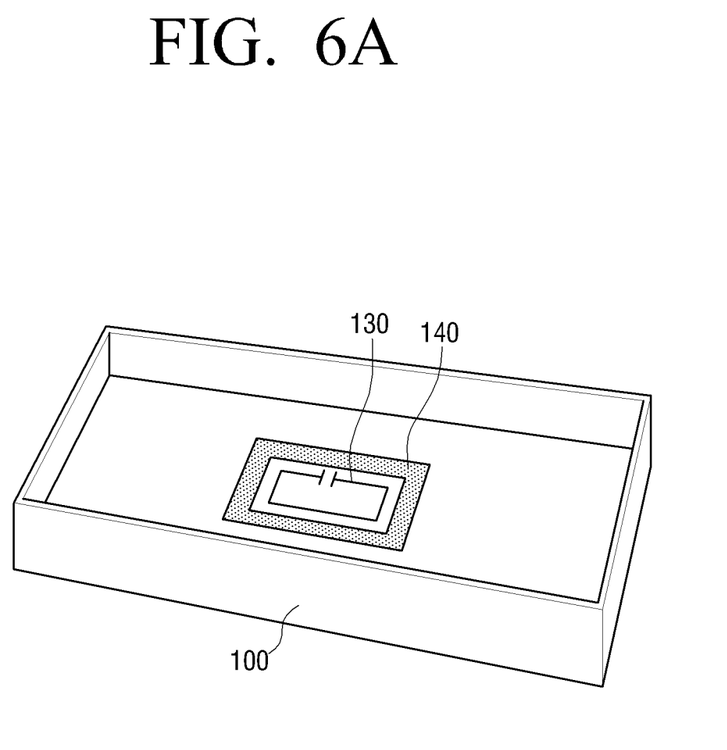
FIG. 6A is a view illustrating the configuration of a wireless charging apparatus according to an exemplary embodiment.
Figure 6B:
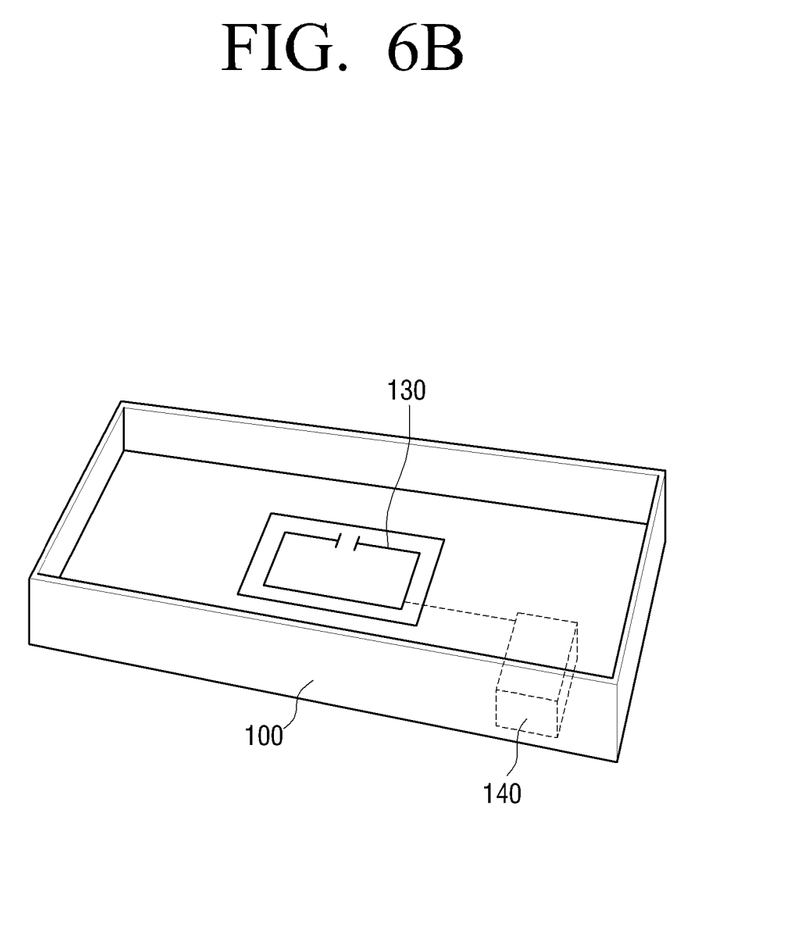
FIG. 6B is a view illustrating the configuration of a wireless charging apparatus according to another exemplary embodiment.

FIGS. 6A and 6B are views illustrating the configuration of a wireless charging apparatus according to an exemplary embodiment. In FIGS. 6A and 6B, only the arrangement of portions of the transmission resonator 130 and the sensing resonator 140 are shown, and the transmission circuit 110, the transmission feeder 120, and the level detector 150 are omitted. As illustrated in FIG. 6A, the sensing resonator 140 in the wireless charging apparatus 100 may be designed in the form of a pattern using a Printed Circuit Board (PCB) or the like of the transmission circuit neighboring the transmission resonator 130. Alternatively, as illustrated in FIG. 6B, the sensing resonator 140 may be arranged to be apart from the transmission resonator 130. However, in this case, it is advantageous if the distance between the two resonators is a distance sufficient to realize the energy transfer between the transmission resonator 130 and the sensing resonator 140.

However, the configuration of the sensing resonator 140 and the transmission resonator 130 as illustrated in FIGS. 6A and 6B are merely exemplary, and it will be apparent to those of ordinary skill in the art that any other configuration may be arranged to achieve the same operation and effect.

Figure 7:
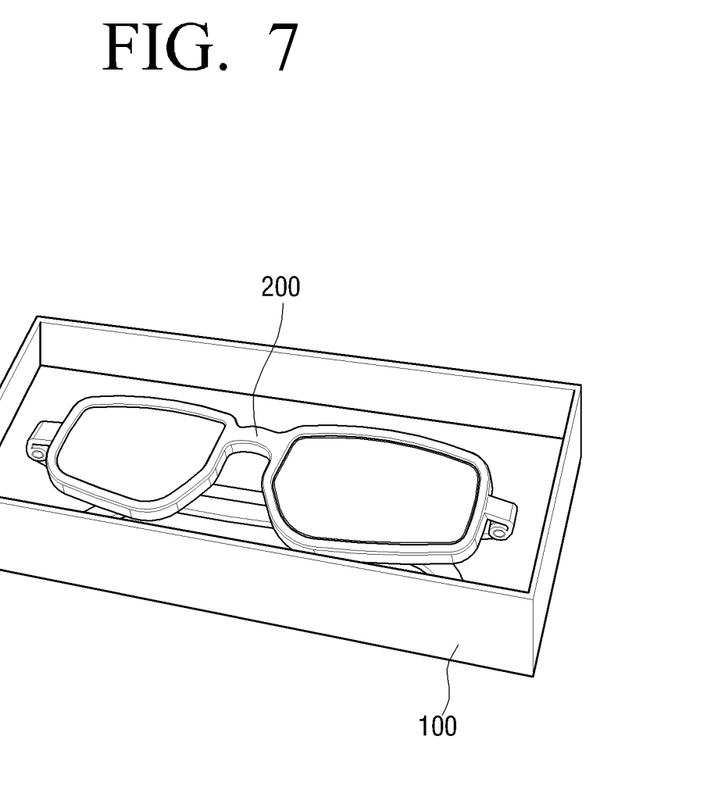
FIG. 7 is a view illustrating an application example of a wireless charging system according an exemplary embodiment.

FIG. 7 is a view illustrating an application example of a wireless charging system according an exemplary embodiment. In this exemplary embodiment, it is assumed that the subject of wireless charging is 3D glasses. If the 3D glasses, which correspond to the receiver, are positioned within the certain distance, the wireless charging apparatus 100, which corresponds to the transmitter, transmits energy to the 3D glasses 200. However, if the 3D glasses become far apart from the wireless charging apparatus 100, the wireless charging apparatus 100 absorbs the energy from the transmission resonator, and at this time, the level detector detects the corresponding signal level difference of the sensing resonator to turn off or reduce the output of the transmission circuit 110.

Accordingly, the wireless charging apparatus 100 can recognize the existence of the 3D glasses, and thus the unnecessary power consumption can be prevented.

Also, according to the wireless power supply apparatus, the wireless charging apparatus, and the wireless charging system according to the exemplary embodiments, since the operation of the transmitter can be controlled through recognition of the existence of a load device, unnecessary power consumption in the transmitter can be prevented.

While the inventive concept has been shown and described with reference to certain exemplary embodiments thereof, it will be understood by those skilled in the art that various changes in form and detail may be made therein without departing from the spirit and scope, as defined by the appended claims.

What is claimed is:

1. A wireless power supply apparatus that wirelessly supplies power to an external device in a resonant method, the wireless power supply apparatus comprising:
   a transmission resonator that transmits energy to the external device by magnetic resonance;
   a sensing resonator that wirelessly receives the energy by magnetic resonance from the transmission resonator, and senses the external device based on the received energy; and
   a transmission circuit that controls the transmission resonator in accordance with an output of the sensing resonator,
   wherein the transmission circuit determines whether to operate the transmission resonator by comparing the output of the sensing resonator with a threshold level.

2. The wireless power supply apparatus as claimed in claim 1, wherein the sensing resonator determines whether the external device is approaching the wireless power supply apparatus based on the received energy.

3. The wireless power supply apparatus as claimed in claim 2, wherein, if a voltage or current that is measured by the sensing resonator is lower than a reference value, the sensing resonator determines that the external device is approaching and outputs a first level.

4. The wireless power supply apparatus as claimed in claim 2, wherein, if a voltage or current that is measured by the sensing resonator is higher than a reference value, the sensing resonator determines that the external device is not approaching and outputs a second level.

5. The wireless power supply apparatus as claimed in claim 1, wherein the sensing resonator has a quality factor (Q) value that is smaller than a Q value of the transmission resonator.

6. The wireless power supply apparatus as claimed in claim 1, wherein the transmission circuit controls the sensing of the sensing resonator by turning on the transmission resonator for a predetermined time in a predetermined period.

7. A wireless charging apparatus included in a wireless charging system, the wireless charging apparatus comprising:
 a transmission resonator;
 a transmission circuit that resonates the transmission resonator by generating a magnetic field; and
 a sensing resonator that wirelessly receives energy by magnetic resonance from the transmission resonator and controls whether to resonate the transmission resonator based on a distance between an external device to be charged and the wireless charging apparatus;
 a level detector that detects a signal level of the sensing resonator,
 wherein the level detector controls an on/off operation of the transmission circuit according to the detected signal level.

8. The wireless charging apparatus as claimed in claim 7, wherein the sensing resonator determines whether the external device to be charged is positioned within a certain distance from the wireless charging apparatus, and controls whether to resonate the transmission resonator according to a result of determination.

9. The wireless charging apparatus as claimed in claim 8, wherein the sensing resonator resonates the transmission resonator if it is determined that the external device to be charged is within the certain distance.

10. The wireless charging apparatus as claimed in claim 7, wherein, if the level of the signal received from the sensing resonator is equal to or greater than a threshold level, the level detector prevents the transmission resonator from resonating by turning off the transmission circuit, and, if the level of the received signal is lower than the threshold level, the level detector controls the resonating of the transmission resonator by turning on the transmission circuit.

11. The wireless charging apparatus as claimed in claim 7, wherein the signal level is a voltage level or a current level that is detected by the sensing resonator.

12. The wireless charging apparatus as claimed in claim 7, wherein the transmission circuit further comprises a transmission feeder;
 wherein the transmission feeder forms a magnetic field that is concentrated on a frequency by exciting the transmission resonator.

13. The wireless charging apparatus as claimed in claim 7, wherein the external device to be charged comprises a reception resonator;
 wherein a resonance frequency of the transmission resonator is equal to a resonance frequency of the reception resonator.

14. The wireless charging apparatus as claimed in claim 13, wherein the transmission resonator and the reception resonator have a quality factor (Q) value that is high, and the sensing resonator has a Q value that is low.

15. The wireless charging apparatus as claimed in claim 13, wherein the external device to be charged changes the Q value of the reception resonator, and the transmission circuit stops the transfer of energy to the external device to be charged.

16. A wireless charging system comprising:
 a transmitter including a transmission resonator; a transmission circuit that resonates the transmission resonator by generating a magnetic field; and a sensing resonator that wirelessly receives energy by magnetic resonance from the transmission resonator and controls whether to resonate the transmission resonator based on a distance between an external device to be charged and the transmitter of the wireless charging system; and
 a receiver including a reception resonator that receives energy from the transmission resonator; and a reception circuit that converts the energy received by the reception resonator into electric energy;
 a level detector that detects a signal level of the sensing resonator,
 wherein the level detector controls an on/off operation of the transmission circuit according to the detected signal level.

17. The wireless charging system as claimed in claim 16, wherein the receiver further comprises a charging unit that charges using the electric energy converted by the reception circuit.

18. The wireless charging system as claimed in claim 16, wherein the sensing resonator determines whether the receiver is positioned within a distance from the transmitter, and controls whether to resonate the transmission resonator according to a result of determination.

19. The wireless charging system as claimed in claim 18, wherein the sensing resonator resonates the transmission resonator if it is determined that the receiver is within the distance from the transmitter.

20. The wireless charging system as claimed in claim 16, wherein, if the level of the signal received from the sensing resonator is equal to or greater than a threshold level, the level detector prevents the transmission resonator from resonating by turning off the transmission circuit, and, if the level of the received signal is lower than the threshold level, the level detector guides the resonating of the transmission resonator by turning on the transmission circuit.

21. The wireless charging system as claimed in claim 16, wherein the signal level is a voltage level or a current level that is detected by the sensing resonator.

22. The wireless charging system as claimed in claim 16, wherein the transmitter further comprises a transmission feeder;
 wherein the transmission feeder forms a magnetic field that is concentrated on a frequency by exciting the transmission resonator.

23. The wireless charging system as claimed in claim 16, wherein a resonance frequency of the transmission resonator is equal to a resonance frequency of the reception resonator.

24. The wireless charging system as claimed in claim 16, wherein the reception circuit controls the reception resonator not to receive energy from the transmission resonator in the case in which charging of the charging unit is completed.

25. The wireless charging system as claimed in claim 16, wherein the reception circuit controls the reception resonator not to receive energy from the transmission resonator by changing a quality factor (Q) value of the transmission resonator in the case in which charging of the charging unit is completed.

26. The wireless charging system as claimed in claim 16, wherein the transmission resonator and the reception resonator have a quality factor (Q) value that is high, and the sensing resonator has a Q value that is low.

* * * * *